United States Patent [19]

Hamer

[11] Patent Number: 4,519,079
[45] Date of Patent: May 21, 1985

[54] ERROR CORRECTION METHOD AND APPARATUS

[75] Inventor: Howard Hamer, Long Branch, N.J.

[73] Assignee: The United States of America as represented by the Secretary of the Army, Washington, D.C.

[21] Appl. No.: 467,551

[22] Filed: Feb. 17, 1983

[51] Int. Cl.³ .............................................. G06F 11/10
[52] U.S. Cl. ........................................ 371/38; 371/39; 371/36
[58] Field of Search ...................... 371/38, 39, 40, 51, 371/36

[56] References Cited

U.S. PATENT DOCUMENTS 3,825,893 7/1974 Bossen et al. .......................... 371/38
4,211,997 7/1980 Rudnick et al. ....................... 371/38
4,238,852 12/1980 Iga et al. ................................ 371/40

Primary Examiner—Charles E. Atkinson
Attorney, Agent, or Firm—Anthony T. Lane; Jeremiah G. Murray; Robert A. Maikis

[57] ABSTRACT

Circuitry and a method for correcting errors in binary data which is stored in memory and subject to errors upon recall therefrom. The technique involves generating a redundant byte related to each original byte to be stored, storing both bytes in memory, and applying the recalled bytes to a decoder designed to correct the errors. If more than a single adjacent error per byte is expected, it is necessary to transpose the bits of the original and redundant bytes before storage so that the bits thereof alternate, and re-transpose the recalled bytes to their original sequence before application to the said decoder.

9 Claims, 4 Drawing Figures

ERROR CORRECTION METHOD AND APPARATUS

The invention described herein may be manufactured, used and licensed by or for the Government for governmental purposes without the payment to me of any royalties thereon.

BACKGROUND OF THE INVENTION

This invention relates to error correction of data stored in binary digital form in memory devices. Such data upon recall from memory may not be the same as that stored in memory because of such things as random errors which will generally result in no more than one error in an eight bit binary byte, and burst errors which can result in multiple digital errors per byte.

The present error correcting technique involves the use of 100% memory redundancy plus a small amount of logic hardware to provide for automatic correction of the above types of errors so long as the number of such errors do not exceed certain limits. Programming techniques have been known through which such errors can be corrected with software, however the rapid decrease in the cost of memory capacity relative to labor intensive software makes the present error correction technique extremely cost effective.

SUMMARY OF THE INVENTION

If the data to be stored in memory comprises eight bit bytes represented as $x_7, x_6, x_5, x_4, x_3, x_2, x_1, x_0$, (or $x_7-x_0$), wherein $x_0$ is the least significant bit and $x_7$ the most significant, then a redundant byte $y_7-y_0$ is generated by modulo 2 addition of adjacent pairs of the bits of the original byte and both the original and redundant bytes are stored in memory. If only random errors are expected the two bytes can be directly stored in memory.

When the data is later read out of or recalled from memory the original and redundant bytes are applied to a decoder comprising two arrays of modulo 2 adders (or exclusive OR gates), each of the arrays comprising a number of such adders equal to the number of bits per byte. One of the arrays of the modulo 2 adders have the bits of the same significance from the recalled original and recalled redundant byte applied to each adder and the other array of adders have the recalled redundant or y bits of significance n and the recalled original or x bits of significance n+1 applied to each adder. The outputs of these two arrays of modulo 2 adders comprise two new binary digital bytes represented as $x_{b7}-x_{b0}$ and $x_{c7}-x_{c0}$. An array of majority vote circuits equal to the number of bits per byte has the original byte as read out of memory applied thereto together with the aforementioned new digital bytes. The outputs of the array of majority vote circuits constitutes the corrected code. In order to facilitate correction of burst errors as defined above, the above apparatus and method are employed, but in addition the bits of the original and redundant code are transported to new positions within the bytes before storage in memory, and are re-transposed to their original byte positions after emerging from memory.

It is thus an object of the invention to provide a novel and useful method and apparatus for correcting both random and burst errors in binary digital information to be stored in memory.

A further object of this invention is to correct errors in binary data upon recall from memory by providing redundant memory capacity combined with certain logic elements, which will correct any random errors of no more than one bit per byte, and will correct three adjacent burst errors per byte.

A still further object of the invention is to provide for error correction of data to be stored in memory by utilizing redundant memory capacity plus certain logic elements to achieve automatic error correction at low cost.

Another object of invention is to provide for low cost error correction of digital data to be stored in memory.

These and other objects and advantages of the invention will become apparent from the following detailed description and the drawings.

DETAILED DESCRIPTION OF A PREFERRED EMBODIMENT

Figure 2:
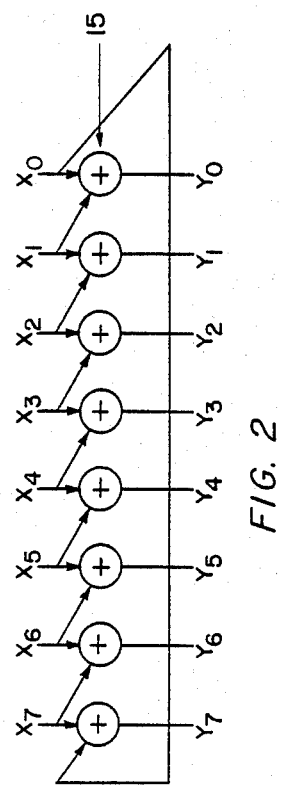
FIG. 2 is a circuit diagram showing logic which can be used to generate the redundant byte.
Figure 1:
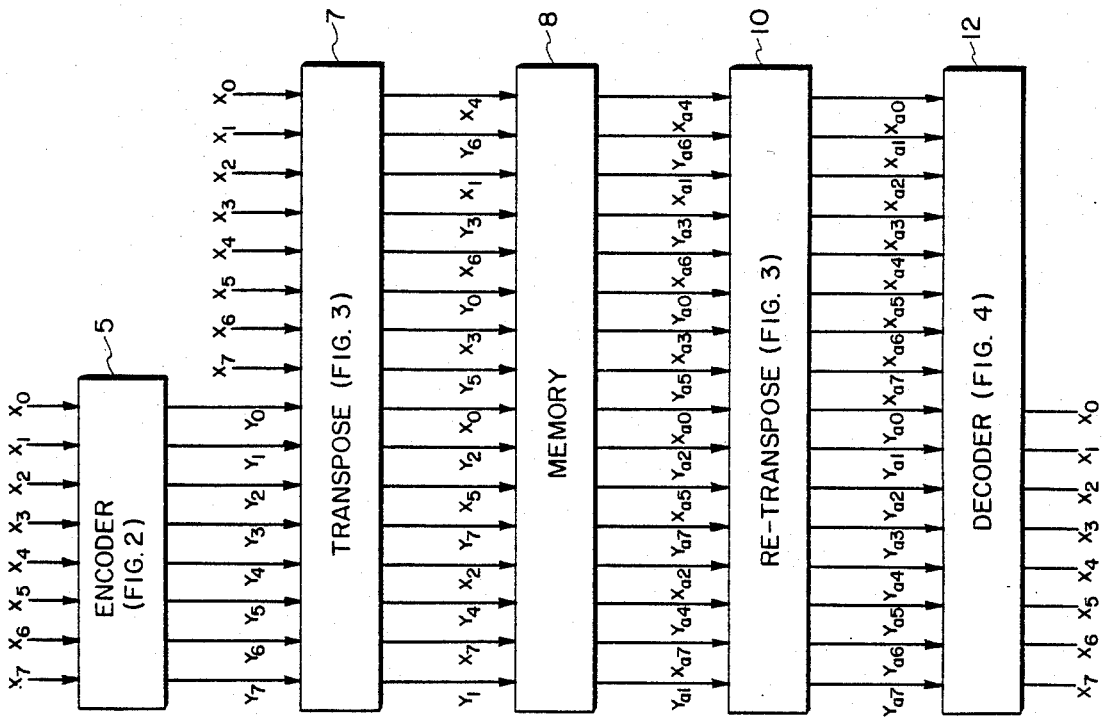
FIG. 1 is a system block diagram illustrating the operation of the invention.

In FIG. 1, the leads $x_7-x_0$ applied to encoder 5 represent an original eight bit byte representing a character or word to be stored in memory 8; $x_0$ being the least significant digit. The encoder circuit 5, shown in detail in FIG. 2, generates a redundant byte, $y_7-y_0$, related to the original byte, by means of an array of modulo 2 adders. As seen in FIG. 2, the circuitry comprises an array of eight such adders, 15, equal in number to the number of bits per byte. A modulo 2 adder is also known as an exclusive OR gate and its output will be binary 1 if one and only one of its inputs is binary 1, and will have binary 0 output for all other inputs. The second input of each of the modulo 2 adders of FIG. 2 is the original digit of next higher significance. Thus the adder on the right end of the array 15 has as its inputs $x_0$ and $x_1$, and the adder next to it has as its inputs $x_1$ and $x_2$, etc. The outputs of the adders of array 15 comprise the redundant byte $y_7-y_0$. The logical relationship between the original and redundant byte can be expressed as follows: $y_n = x_n \oplus x_{n+1}$, wherein n is the significance of the binary digit involved.

Figure 3:
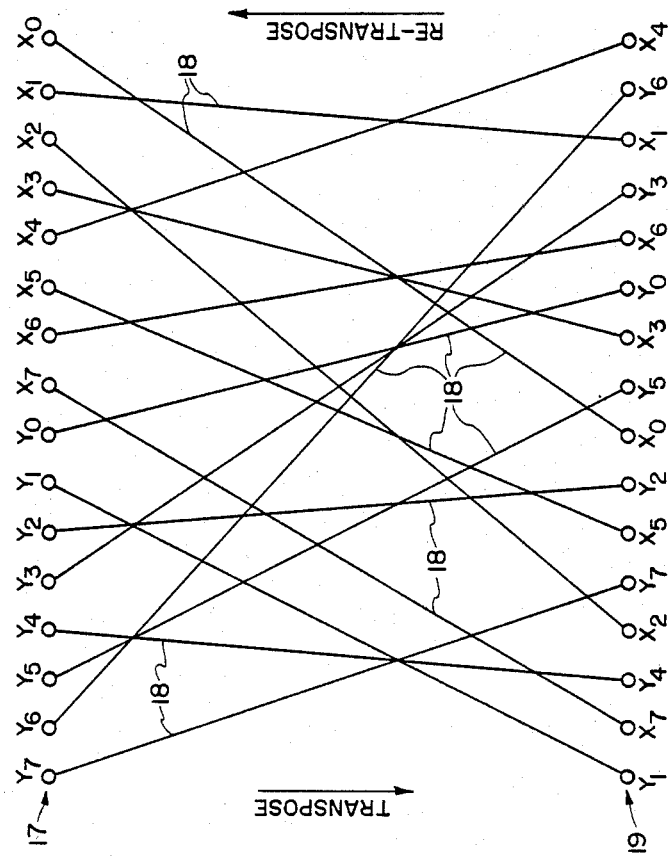
FIG. 3 is a diagram of a transpose and re-transpose circuit used to correct burst errors.

As seen in FIG. 1, the redundant byte $y_7-y_0$ plus the original byte $x_7-x_0$ are applied to transpose circuit 7, shown in detail in FIG. 3. The transpose circuit reorders or re-arranges all sixteen bits of the two bytes applied thereto into a sixteen bit word in which the bits of the original and redundant bytes are alternated. Thus it can be seen that none of the leads emerging from transpose circuit 7 has adjacent x and y bits thereon. In addition to this alternation, the significance of the bits are transposed so that none are in proper sequence and that the transposed byte has no adjacent digits with adjacent significance. The diagram of FIG. 3 shows how such transposition of digits can be accomplished by merely cross connecting two sets of terminals 17 and 19 by means of conductors such as 18. As can be seen from FIGS. 1 and 3, this transposing results in a sixteen bit word which can be represented as: $y_1, x_7, y_4, x_2, y_7, x_5, y_2, x_0, y_5, x_3, y_0, x_6, y_3, x_1, y_6, x_4$. This sixteen bit transposed word is stored in memory 8, as indicated in FIG. 1.

The data recalled from memory may or may not be the same as that stored therein because of the aforementioned errors. The data will be recalled from memory as sixteen bit words. The transposed sixteen bit word as recalled from memory is represented as $x_{a4}$, $y_{a6}$, $x_{a1}$, $y_{a3}$, etc., as indicated by the labels on the leads emerging from memory 8, wherein $x_{a4}=x_4$, $y_{a4}=y_4$, etc., in the absence of error. This recalled sixteen bit word is then applied to re-transpose circuit 10 wherein the bits thereof are re-ordered back into their original sequence by simply passing the byte through the circuit of FIG. 3 from bottom to top, as indicated by the arrow labelled "re-transpose". The output of the re-transpose circuit 10 will comprise the original recalled byte $x_{a7}-x_{a0}$ and the redundant recalled byte $y_{a7}-y_{a0}$, as indicated at the output of circuit 10. These two bytes are applied to the decoder circuit 12, shown in detail in FIG. 4. This circuit decodes the information in the two bytes applied thereto to produce the original corrected code $x_7-x_0$.

Figure 4:
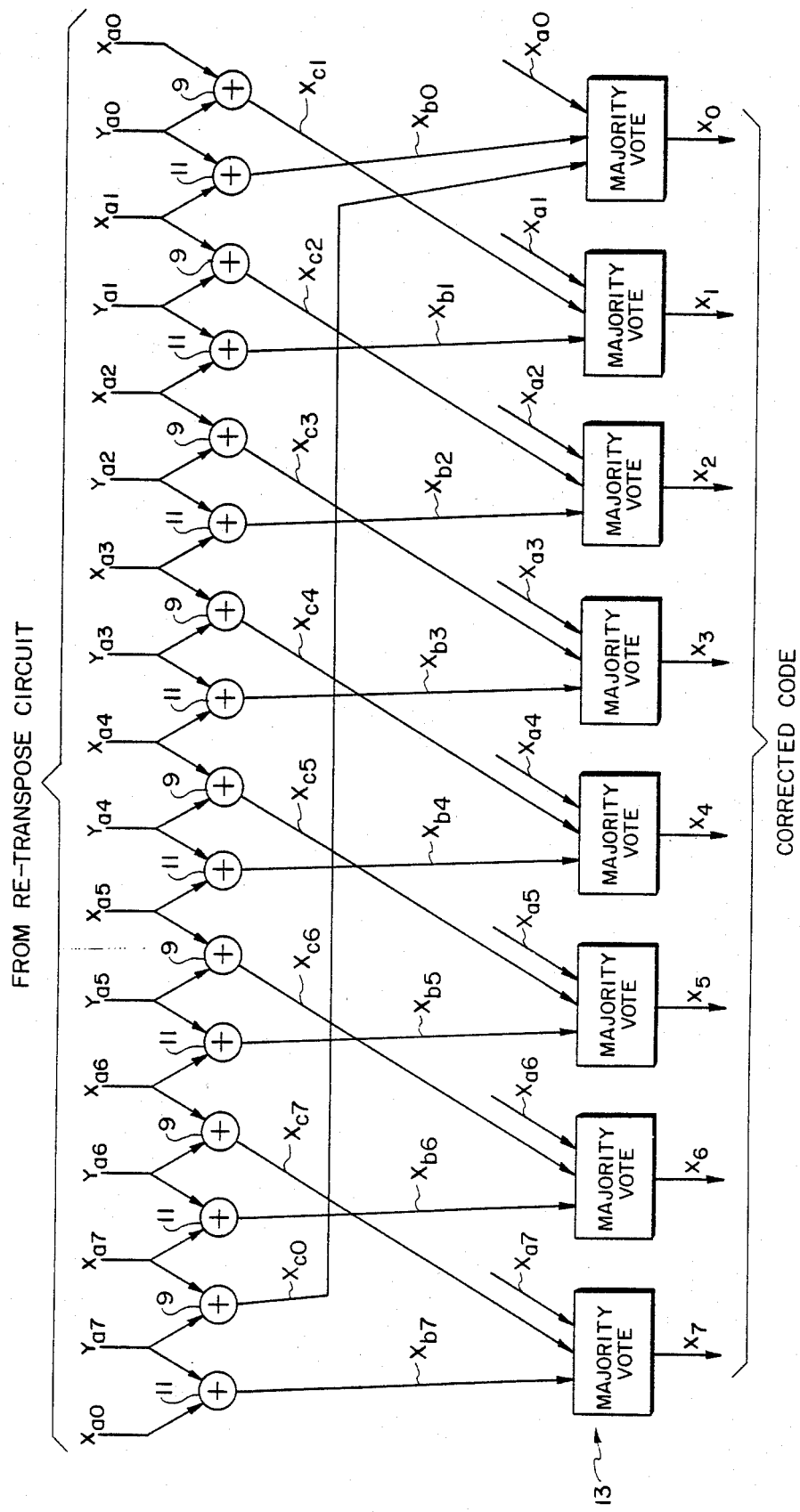
FIG. 4 is a diagram of the decoder used to produce the corrected code from erroneous codes read out of memory.

As shown in FIG. 4, the decoder 12 comprises two arrays of eight modulo 2 adders, 9 and 11, one adder for each bit applied to the circuit. The first adder array, 9, has as its inputs the recalled original and redundant bits of the same significance. Thus the right hand adder of array 9 has as its inputs $y_{a0}$ and $x_{a0}$ and the next adder of array 9 has inputs of $x_{a1}$ and $y_{a1}$, etc. The second array of adders, 11, have as inputs the recalled original bits of given significance, i.e., $x_{an}$, plus the recalled redundant bit of next lesser significance, $y_{a(n-1)}$. The first adder array 9, produces a first new byte referenced as $x_{c7}-x_{c0}$, wherein $x_{cn}=x_{a(n-1)}\oplus y_{a(n-1)}$, while the second adder array 11, produces a second new byte referenced as $x_{b7}-x_{b0}$, wherein $x_{bn}=x_{a(n+1)}\oplus y_{an}$. As shown in FIG. 4, these two new bytes are applied to an array of eight majority vote circuits 13, one for each bit per byte. The third input of each majority vote circuit is the appropriate bit of the recalled original code, $x_{a7}-x_{a0}$. Each majority vote circuit produces a binary output corresponding to the majority of the binary signals at its inputs. For example if the inputs are binary 1, 1, and 1, or 1, 1 and 0, the output will be binary 1. If the inputs are binary 0, 0, 1 or 0, 0, 0, the output will be binary 0, etc. The outputs of the majority vote circuits comprise the corrected original code, as indicated.

If only random errors of not more than one bit per byte are to be expected and corrected, the circuitry of FIG. 1 can be simplified by omitting both the transpose and re-transpose circuits, 7 and 10. With this simplified circuit the original byte $x_7-x_0$ and the redundant byte $y_7-y_0$ would be stored in memory and recalled therefrom as bytes $x_{a7}-x_{a0}$ and $y_{a7}-y_{a0}$, for direct application to the decoder 12. An example of how this simplified circuitry corrects single bit errors is shown by the following example:

TABLE A

| n ... | 7 6 5 4 3 2 1 0 | |
|---|---|---|
| $x_7-x_0$ ... | 0 0 0 0 1 0 0 0 | ... Into memory |
| $x_{a7}-x_{a0}$ ... | 0 0 0 0 0 0 0 0 | ... Out of memory, with error |
| $y_7-y_0$ ... | 0 0 0 0 1 1 0 0 | ... Into memory |
| $y_{a7}-y_{a0}$ ... | 0 0 0 0 1 1 0 0 | ... Out of memory, no error |
| $x_{c7}-x_{c0}$ ... | 0 0 0 1 1 0 0 0 | ... From logic |
| $x_{b7}-x_{b0}$ ... | 0 0 0 0 1 1 0 0 | ... From logic |
| Majority out ... | 0 0 0 0 1 0 0 0 | ... Corrected original code |

It can be seen that the recalled original code, $x_{a7}-x_{a0}$, has a single error in that the binary 1 at position $n=3$ has been recalled from memory as a binary 0, and that the recalled redundant code, $y_{a7}-y_{a0}$, has no error. It can be seen that the inputs of the least significant or $n=0$ majority vote circuit are all binary 0, resulting in a 0 output, the inputs of the majority vote circuit for $n=1$ are also all binary 0, whereas the inputs of the majority vote circuit for $n=2$ are binary 0, 0, and 1 resulting in a binary 0 output for this digit. For the $n=3$ digit the majority vote circuit inputs are binary 0, 1 and 1, resulting in an output of binary 1. All of the remaining digits are binary 0s. It can be seen that the erroneous binary 0 at $n=3$ of the original byte as read out of memory has been outvoted or corrected by the two binary 1s of the newly generated bits $x_{c3}$ and $x_{b3}$.

The following table illustrates the operation of the apparatus and method for an error in the redundant byte or code as it is recalled from memory, for the simplified circuit mentioned above.

TABLE B

| n ... | 7 6 5 4 3 2 1 0 | |
|---|---|---|
| $x_7-x_0$ ... | 0 0 0 0 1 0 0 0 | ... In/out of memory |
| $y_7-y_0$ ... | 0 0 0 0 1 1 0 0 | ... Into memory |
| $y_{a7}-y_{a0}$ ... | 0 0 0 0 1 1 0 1 | ... Out of memory, with error |
| $x_{c7}-x_{c0}$ ... | 0 0 0 1 1 0 1 0 | ... From logic |
| $x_{b7}-x_{b0}$ ... | 0 0 0 0 1 0 0 1 | ... From logic |
| Majority out ... | 0 0 0 0 1 0 0 0 | ... Corrected code |

Again it can be seen that the output of the majority vote circuits is the original code corrected for the error in the redundant code as read out of memory.

It can be seen that the operation of the simplified circuit in correcting signal errors depends on the fact that there are no errors in the bits adjacent to the erroneous bit. Thus the simplified circuit may not correct more than one error per byte. However it will also be appreciated that the transposing circuit re-orders the binary digits in memory so that no two of the original or redundant bits are adjacent to each other in memory. Thus if any two adjacent bits of the sixteen bit byte as recalled from memory are in error, the re-transposed bytes $y_{a7}-y_{a0}$ and $x_{a7}-x_{a0}$ will each contain only one error, due to the alternating re-ordering of the bits by the transposing circuitry.

A further example will illustrate how the full circuit of FIG. 1 will yield a corrected code if two adjacent bits, for example bits $x_{a3}$ and $y_{a5}$, as recalled from memory, are both erroneous.

TABLE C

| n ... | 7 6 5 4 3 2 1 0 | |
|---|---|---|
| $x_7-x_0$ ... | 0 0 0 0 1 0 0 0 | ... Into memory |
| $x_{a7}-x_{a0}$ ... | 0 0 0 0 0 0 0 0 | ... Out of memory, with error |
| $y_7-y_0$ ... | 0 0 0 0 1 1 0 0 | ... Into memory |
| $y_{a7}-y_{a0}$ ... | 0 0 1 0 1 1 0 0 | ... Out of memory, with error |
| $x_{c7}-x_{c0}$ ... | 0 1 0 1 1 0 0 0 | ... From logic |
| $x_{b7}-x_{b0}$ ... | 0 0 1 0 1 1 0 0 | ... From logic |
| Majority out ... | 0 0 0 0 1 0 0 0 | ... Original code corrected |

In this example $x_{a3}$ and $y_{a5}$ which are adjacent bits of the sixteen bit byte as stored and recalled from memory, are both erroneous in that $x_{a3}$ should be binary 1 and $y_{a5}$ should be binary 0. It can be seen that the re-transposing of the sixteen bit byte, followed by the decoding in circuit 12 has resulted in correction of this burst error.

While the invention has been described in connected with illustrative embodiments, obvious variations therein will occur to those skilled in the art without the exercise of invention, accordingly the invention should be limited only by the scope of the appended claims.

I claim:

1. Error correction circuitry comprising means to generate a redundant byte, $y_7-y_0$, for each original byte, $x_7-x_0$, by modulo 2 addition of adjacent pairs of bits of said original byte, means to store both said original and redundant bytes in memory, means to recall said original and redundant bytes from memory, said recalled original and redundant bytes being represented as $x_{a7}-x_{a0}$ and $y_{a7}-y_{a0}$, respectively, means to apply said recalled original and redundant bytes to two arrays of modulo 2 adders to obtain two new bytes represented as $x_{b7}-x_{b0}$ and $x_{c7}-x_{c0}$, wherein $x_{bn}=x_{a(n+1)}\oplus y_{an}$, and $x_{cn}=x_{a(n-1)}\oplus y_{a(n-1)}$, and means to apply corresponding bits of said new bytes and said recalled original byte to one of an array of majority vote circuits, whereby the output of said array of majority vote circuits comprises the corrected code.

2. The circuitry of claim 1 wherein the relationship of said original and redundant bytes is expressed as, $y_n=x_n\oplus x_{n+1}$, and wherein each byte contains eight binary bits, and the number of said modulo 2 adders per array and the number of majority vote circuits per array is eight.

3. Apparatus for error correction of binary digital codes recalled from memory comprising means providing for 100% memory redundancy whereby an original and redundant byte are stored in memory and wherein said redundant byte is generated by logic circuitry to which said original byte is applied, further logic circuitry arranged to produce two new bytes from the said original and redundant bytes as recalled from memory, and majority vote logic circuitry for receiving said two new bytes and said original byte as recalled from memory and producing a corrected code comprising the majority vote of the corresponding digits of said two new bytes and said original byte as recalled from memory.

4. The apparatus of claim 3 wherein said majority vote logic circuitry comprises an array of majority vote circuits, one majority vote circuit for each bit per byte, and whereby the output of said array comprises the original code as corrected.

5. The apparatus of claim 3, further comprising means to transpose said original and redundant bytes before storage in memory and means to similarly re-transpose said bytes upon recall from memory before application to said further logic.

6. A method of error correction of binary digital codes upon recall from memory, comprising the steps of generating a related 100% redundant byte from each original byte to be stored in memory, storing said original and redundant bytes in memory, upon recall of said bytes from memory applying each said original and related redundant byte to logic circuits for producing two new bytes, said logic circuits being designed so that the majority vote of corresponding digits of said new bytes and said original byte as recalled from memory constitute the corrected code.

7. Error correction circuitry comprising, means to generate a redundant byte, $y_7-y_0$, for each original byte, $x_7-x_0$, wherein $y_n=x_n\oplus x_{n+1}$, and means to transpose the bits of both said bytes so that the x and y bits are alternated, means to store said original and redundant transposed bytes in memory, means to recall said transposed bytes from memory and means to re-transpose them to their original sequence, and means to apply said re-transposed original and redundant recalled bytes to a decoder circuit comprising two arrays of modulo 2 adders which produce two new bytes represented as $x_{b7}-x_{b0}$ and $x_{c7}-x_{c0}$, and means to apply said two new bytes plus said original recalled byte to an array of majority vote circuits, the output of said majority vote circuits comprising the original corrected code, whereby burst errors of up to two bits in the bytes as recalled from memory may be corrected.

8. The circuit of claim 7 wherein $x_{bn}=x_{a(n+1)}\oplus y_{an}$ and $x_{cn}=x_{a(n-1)}\oplus y_{a(n-1)}$.

9. A method of error correction for burst errors in data recalled from memory, comprising the steps of generating a related 100% redundant byte from each original byte to be stored in memory, transposing the bits of each of said original and redundant bytes so that the bits of each byte alternate, storing the bytes so transposed in memory, re-transposing said bytes upon recall from memory to their original sequence, applying said recalled original and redundant bytes to logic circuitry to produce two new bytes, and then determining the corrected code from the majority vote of the corresponding bits of said new bytes plus said recalled original byte.

* * * * *